(No Model.)
W. D. HALLIBURTON & C. T. OWENS.
STEAM COOKING VESSEL.
No. 463,228. Patented Nov. 17, 1891.
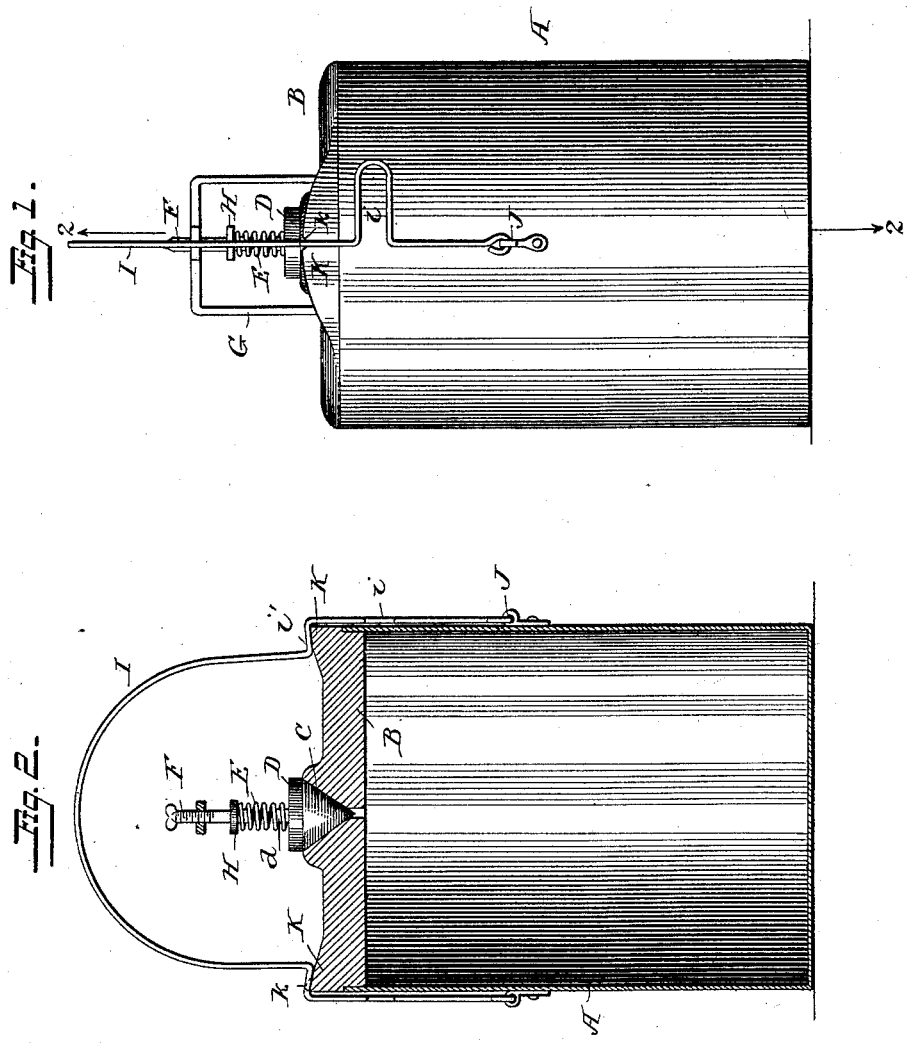

UNITED STATES PATENT OFFICE.

WILLIAM D. HALLIBURTON AND CHARLES T. OWENS, OF JACKSONVILLE, MISSOURI.

STEAM COOKING-VESSEL.

SPECIFICATION forming part of Letters Patent No. 463,228, dated November 17, 1891.

Application filed July 3, 1891. Serial No. 398,399. (No model.)

*To all whom it may concern:*

Be it known that we, WILLIAM D. HALLIBURTON and CHARLES T. OWENS, citizens of the United States, residing at Jacksonville, in the county of Randolph and State of Missouri, have invented certain new and useful Improvements in Steam Cooking-Vessels; and we do hereby declare the following to be a full, clear, and exact description of the invention, such as will enable others skilled in the art to which it appertains to make and use the same.

Our invention has for its object to produce a steam cooking-vessel wherein food may be cooked by superheated steam and under pressure; and it consists of a vessel provided with a cover fitting steam-tight and with a safety-valve, which cover is connected with the vessel and held in place thereon by a spring or elastic holding device; and it consists, further, in the improvements in the details of construction of these parts referred to.

Figure 1 is an elevation of a cooking-vessel embodying our improvements. Fig. 2 is a vertical section taken on the line 2 2 of Fig. 1.

In the drawings, A represents a cooking-vessel, which may be of any suitable shape and construction and made strong enough to withstand a steam-pressure of fifteen or twenty pounds to the square inch. The cover B fits the open end of the vessel steam-tight, the lapping parts being ground, if desired, to secure such steam-tight fit.

C designates an aperture through the cover, and D a valve closing it. The valve may be of any suitable shape, a conical form being found efficient, and one of that character is shown in the drawings. It is held to its seat by a spring E, and this in turn is placed under varying degrees of compression by an adjusting device F, shown as consisting of a screw-rod which is mounted in a bracket or support G. When a coiled spring and adjusting-screw are employed, the valve D is preferably provided with a central projection $d$, over which the spring fits, and the end of the screw rests upon a bearing-piece H, which has a projection $h$ extending into the coiled spring. The valve acts as a safety-valve when the steam-pressure within the vessel becomes too great to permit the steam to escape through the opening C, and it will be understood that any well-known or preferred form of safety-valve might be employed, the one shown, however, being the one which we prefer to employ.

The cover is held in place upon the vessel by clamping devices, which have a certain amount of spring or elasticity, so that should the safety-valve D from any cause fail to operate the cover will be raised against the holding-down action of the clamps before the pressure becomes so great as to cause an explosion.

The form of cover-holding clamps which we prefer to employ is that shown, and consists of a spring-bail I, secured to ears J upon opposite sides of the vessel, which bail is adapted also to serve as the swinging handle for the vessel. It is formed of a rod or heavy wire of spring metal and is bent to have the spring portions $i$ $i$ arranged on the opposite sides of the vessel and the inturned portions $i'$ $i'$ arranged above the spring parts and so as to overlie the cover. Along the opposite edges of the cover there are formed the upward-projecting portions K K, having recesses or notches $k$ in their upper edges. The upper edges of the projections K upon one or both sides of the notches $k$ gradually slope downward to the top of the cover.

When the cover is placed upon the vessel, it is arranged so that the projecting portions K thereof are directly above the ears J, to which the bail is pivoted. The bail can then be swung upward over the cover into the position shown in the drawings, and as it is being brought into its upright position the inturned portions $i'$ thereof are caused to ride up the inclined portions of the projections and are thereby forced upward, the springs $i$ expanding until the portions $i'$ come opposite the notches $k$, when the springs will draw the bent portions $i'$ of the bail therein and so lock the cover in place, though with a yielding force.

In ordinary cooking the safety-valve is depended upon entirely to determine the pressure at which the steam shall blow off. If, however, it is desired to cook more rapidly than usual, or to subject the articles being cooked to a great heat, the adjusting device F is screwed down until the valve is held tightly upon its seat, when the springs $i$ alone will determine the pressure which the steam will have to acquire before the cover will be lifted to allow this steam to escape.

It will be seen that the spring cover-holding device acts as a supplemental safety device for preventing explosions, besides acting both to hold the cover in place and as a handle for the vessel.

What we claim is—

1. The combination, with the vessel and the cover fitting steam-tight, of the safety-valve and the spring holding-clamp for the cover, which serves as a supplemental safety device, substantially as set forth.

2. The combination of the vessel, the cover fitting steam-tight and provided with the steam-escape opening, the valve fitting the said opening, the spring holding the valve in its seat, the adjusting-screw for the spring, and the support for the screw, substantially as set forth.

3. The combination of the vessel, the cover fitting steam-tight, and the spring-bail I, bent to form the spring portions $i$, and the inturned parts $i'$, which overlie the cover, substantially as set forth.

4. The combination of the vessel, the cover provided with the notched raised portions K, and the pivoted spring-bail secured to the vessel and having the inturned portions $i'$, adapted to overlie the cover and engage with the notches in the raised portions thereof, substantially as set forth.

In testimony whereof we affix our signatures in presence of two witnesses.

WILLIAM D. HALLIBURTON.
CHAS. T. OWENS.

Witnesses:
J. M. HALLIBURTON,
A. T. BROWN.